US012465167B2

(12) United States Patent
DiTrolio

(10) Patent No.: US 12,465,167 B2
(45) Date of Patent: Nov. 11, 2025

(54) ACCESSORY HANGER

(71) Applicant: Philip DiTrolio, Suwanee, GA (US)

(72) Inventor: Philip DiTrolio, Suwanee, GA (US)

( * ) Notice: Subject to any disclaimer, the term of this patent is extended or adjusted under 35 U.S.C. 154(b) by 0 days.

(21) Appl. No.: 18/218,952

(22) Filed: Jul. 6, 2023

(65) Prior Publication Data

US 2024/0008671 A1      Jan. 11, 2024

Related U.S. Application Data

(60) Provisional application No. 63/359,363, filed on Jul. 8, 2022.

(51) Int. Cl.
*A47H 1/142* (2006.01)

(52) U.S. Cl.
CPC ................... *A47H 1/142* (2013.01)

(58) Field of Classification Search
CPC ...... A47H 1/142; A47H 13/04; E04H 1/1272; E04B 2002/7466; E04B 2002/7487; E04B 1/2403; E04B 2001/2409; F16B 12/40; F16B 45/00; F16B 2200/30; F16B 7/044; F16B 7/048; F16B 7/0493; F16B 5/0052; Y10T 24/51; Y10T 24/3484
USPC ............. 52/653.1–653.2; 403/217, 169–170; 248/224.8, 223.41, 223.51, 223.61, 224.7, 248/74.2, 692, 215, 227.1, 304–307, 248/219.2, 297.21, 314, 121, 49, 58, 60, 248/62, 65, 70, 73, 74.1, 80, 218.4
See application file for complete search history.

(56) References Cited

U.S. PATENT DOCUMENTS

| | | | | |
|---|---|---|---|---|
| 177,471 A * | 5/1876 | Clark | ....................... | A22B 5/06 452/187 |
| 4,019,298 A * | 4/1977 | Johnson, IV | ........... | E04B 1/185 403/381 |
| 4,117,629 A * | 10/1978 | Ekdahl | ..................... | A01G 9/02 248/214 |
| 4,226,394 A * | 10/1980 | Einhorn | ................ | F16B 45/023 D8/367 |
| 4,408,922 A * | 10/1983 | D'Alessio | ............... | F16B 7/044 403/387 |
| 5,244,300 A * | 9/1993 | Perreira | .................... | E04B 5/43 403/333 |
| 5,291,708 A * | 3/1994 | Johnson | .................. | E04H 17/16 47/33 |
| 5,310,148 A * | 5/1994 | Dorr | .................... | A47B 96/061 248/223.41 |

(Continued)

*Primary Examiner* — Ingrid M Weinhold
(74) *Attorney, Agent, or Firm* — Johnson, Marcou, Isaacs & Nix, LLC

(57) ABSTRACT

The technology includes an accessory hanger that allows a horizontally mounted pipe to be supported from an adjacent vertically mounted pipe. A pipe-mounted coupler mounts on the vertically configured pipe end to allow one or more accessory connections to be affixed to a vertical rectangular extrusion. Channel openings and channel walls on the accessory hanger are mated with the grooves on the pipe-mounted coupler creating a clamped, friction mating such that the accessory hanger is securely fastened to the pipe-mounted coupler. The accessory hanger has a hook or other circular section that is affixed to the channel walls to support a substantially cylindrical, horizontally mounted pipe or tube. The circular section may snap around the pipe and secure the pipe in place.

17 Claims, 10 Drawing Sheets

(56) References Cited

U.S. PATENT DOCUMENTS

| | | | | |
|---|---|---|---|---|
| 5,356,234 A * | 10/1994 | Vangool | ............... | E04B 1/1903 403/171 |
| 5,433,413 A * | 7/1995 | Adams | ................... | A47K 10/10 248/224.7 |
| 5,802,798 A * | 9/1998 | Martens | ............... | E04B 1/1909 52/649.6 |
| D406,051 S * | 2/1999 | Ross | ............................ | D8/395 |
| 6,161,262 A * | 12/2000 | Pfister | ................... | F16M 13/022 248/229.11 |
| 6,554,232 B1 * | 4/2003 | Macris | ................... | F16B 5/0685 248/65 |
| 6,554,235 B1 * | 4/2003 | Fortier | ................... | A47B 91/02 248/200.1 |
| 6,637,707 B1 * | 10/2003 | Gates | ................... | A47B 96/061 248/222.12 |
| 7,780,122 B1 * | 8/2010 | Herbers | ................... | H02G 3/30 248/58 |
| 8,020,328 B2 * | 9/2011 | Lavi | ........................ | A47F 5/105 40/605 |
| 8,356,778 B2 * | 1/2013 | Birli | ........................ | F16L 3/237 248/65 |
| 8,702,054 B2 * | 4/2014 | Lindner | ................... | B62B 5/00 248/231.71 |
| 8,882,053 B2 * | 11/2014 | Chirpich | ................... | F16L 3/08 248/68.1 |
| 8,894,022 B2 * | 11/2014 | Chirpich | ................... | F16L 3/137 248/62 |
| 8,905,249 B2 * | 12/2014 | Whitacre | ............... | E04B 2/7416 248/218.4 |
| 9,004,145 B2 * | 4/2015 | Toledo | ................... | A47G 5/00 160/351 |
| 9,211,027 B2 * | 12/2015 | Ovist | ....................... | A47H 1/04 |
| 9,657,894 B2 * | 5/2017 | Gibbons | ............... | F16M 13/02 |
| 10,702,085 B1 * | 7/2020 | Newport | ............... | A47H 1/142 |
| 10,941,560 B2 * | 3/2021 | DiTrolio | ................... | A47H 1/02 |
| 11,439,254 B1 * | 9/2022 | Kacines | ................... | A47F 5/06 |
| 2002/0096610 A1 * | 7/2002 | Fernandez | ................ | G09F 7/18 248/223.41 |
| 2005/0098272 A1 * | 5/2005 | Rizzo | ....................... | A47H 1/14 160/38 |
| 2005/0103961 A1 * | 5/2005 | Swanstrom | ........... | F16B 45/036 248/305 |
| 2006/0165482 A1 * | 7/2006 | Olberding | ................ | E04B 1/24 403/381 |
| 2006/0249634 A1 * | 11/2006 | Van Walraven | ...... | F16L 3/2431 248/74.1 |
| 2006/0278777 A1 * | 12/2006 | Atkinson | ............. | A47B 13/021 248/188.4 |
| 2008/0078891 A1 * | 4/2008 | Hobson | ..................... | F16L 3/13 248/74.2 |
| 2010/0012792 A1 * | 1/2010 | Gollin | ....................... | H02G 3/30 248/74.2 |
| 2013/0015288 A1 * | 1/2013 | Hernandez | ................ | F16L 3/13 248/223.41 |
| 2013/0255895 A1 * | 10/2013 | Toledo | ................... | F16B 12/42 160/382 |
| 2014/0231606 A1 * | 8/2014 | Sobb | ....................... | A47F 5/0823 248/224.8 |
| 2016/0095460 A1 * | 4/2016 | Ovist | ....................... | A47H 1/02 403/119 |
| 2018/0119410 A1 * | 5/2018 | DiTrolio | ................ | E04B 1/1272 |
| 2019/0231108 A1 * | 8/2019 | Ovist | ..................... | A47H 1/102 |
| 2020/0383509 A1 * | 12/2020 | DiTrolio | ................. | E04B 1/185 |
| 2021/0068576 A1 * | 3/2021 | DiTrolio | ................. | F16B 7/0433 |
| 2021/0180312 A1 * | 6/2021 | DiTrolio | ................. | F16B 2/12 |
| 2022/0090734 A1 * | 3/2022 | Atakan | ................... | F16B 2/243 |
| 2024/0115065 A1 * | 4/2024 | Park | ....................... | A47H 1/122 |

* cited by examiner

ACCESSORY HANGER

CROSS-REFERENCE TO RELATED APPLICATIONS

This application claims priority to U.S. Provisional Patent Application No. 63/359,363, filed Jul. 8, 2022, and entitled "Accessory Hanger." The entire contents of the above-identified application are hereby fully incorporated herein by reference.

FIELD OF INVENTION

The present invention relates to couplers for drape rods of the type typically found in exhibit booths. In even greater particularity, the present invention relates to an accessory hanger that allows a horizontally mounted pipe to be supported from an adjacent vertically mounted pipe.

SUMMARY OF THE INVENTION

An object of the invention is to enable the industry standard hooks on horizontal rods and other accessories to rest at such a height as to provide uniform appearance to the top of drape walls. An accessory hanger allows a horizontally mounted pipe to be supported from an adjacent vertically mounted pipe. A pipe-mounted coupler mounts on the vertically configured pipe end to allow one or more accessory connections to be affixed to the vertical rectangular extrusion. Channel openings and channel walls on the accessory hanger are mated with the grooves on the pipe-mounted coupler creating a clamped, friction mating such that the accessory hanger is securely fastened to the pipe-mounted coupler. The accessory hanger has a hook or other circular section that is affixed to the channel walls to support a substantially cylindrical, horizontally mounted pipe or tube. The circular section may snap around the pipe and secure the pipe in place.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

Referring to the drawings, which are appended hereto and which form a portion of this disclosure, it may be seen that.

DETAILED DESCRIPTION

The example embodiments described herein provide an accessory hanger that supports horizontal pipes for the Pipe and Drape industry. The "Pipe and Drape" industry is a subset of exhibition and convention services in which frameworks are constructed from horizontally and vertically disposed members in such a fashion to allow draperies or curtains to hang and create division of space in convention halls or other similar areas by arranging drapery walls and booths. The pipe-mounted coupler, such as a Castletop™ coupler, is designed to provide an improvement to form and function over the industry standard hook and slot technology, while allowing users of existing systems to continue using their inventory of components. The pipe-mounted coupler mounts on a vertically configured pipe end to allow one or more accessory connections to be affixed to the vertical rectangular extrusion.

Channel openings and channel walls on the accessory hanger are mated with the grooves on the pipe-mounted coupler creating a clamped, friction mating such that the accessory hanger is securely fastened to the pipe-mounted coupler. The accessory hanger has a hook or other circular section that is affixed to the channel walls to support a substantially cylindrical, horizontally mounted pipe or tube. In alternate examples, the pipe is mounted in a configuration that is not horizontal, such as at a 45 degree angle or even vertical. Throughout the specification, the pipe will be described as horizontally mounted, but other configurations may be considered throughout.

Figure 1:
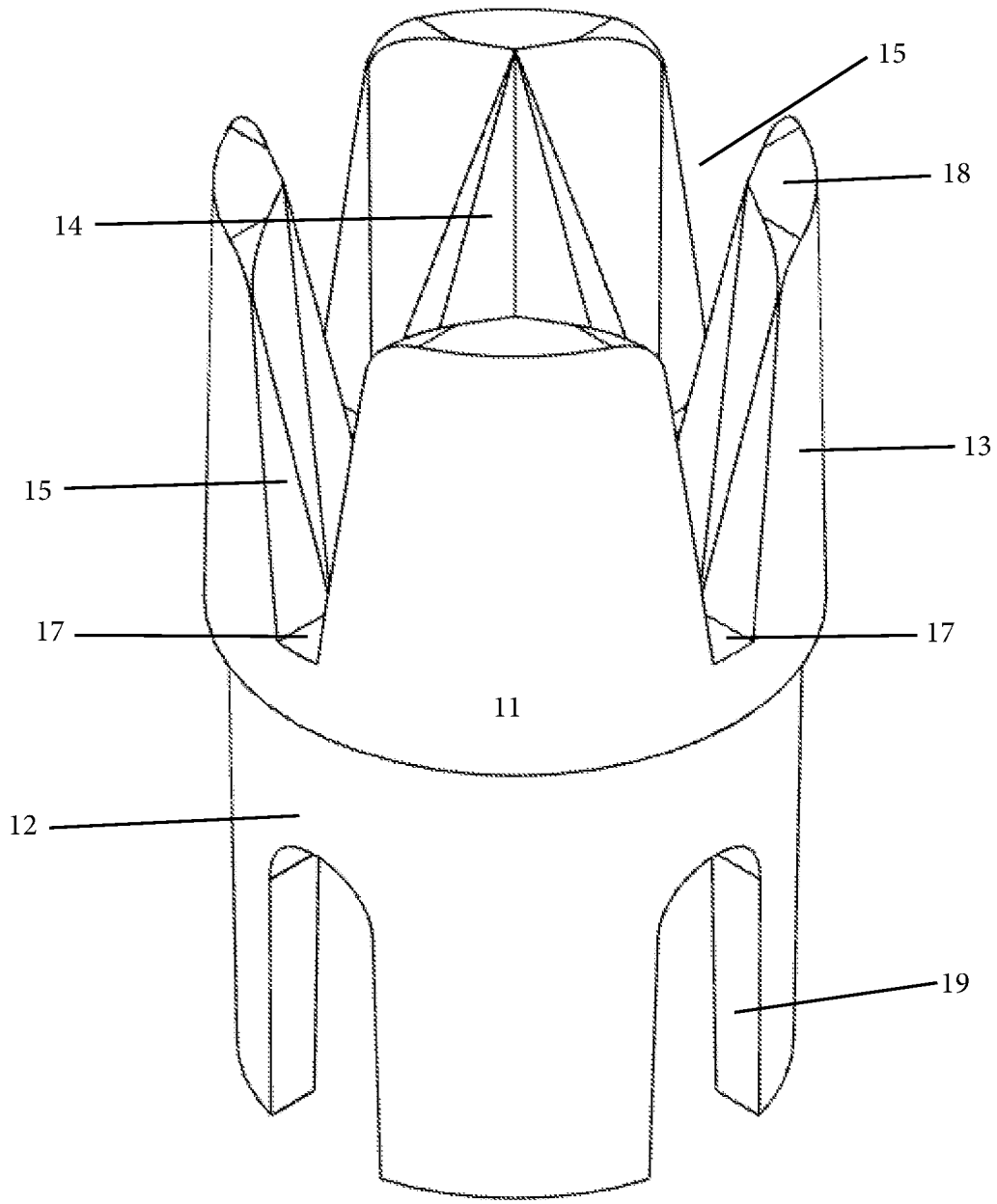
FIG. 1 is a perspective view of one embodiment of a pipe-mounted coupler.
Figure 2:
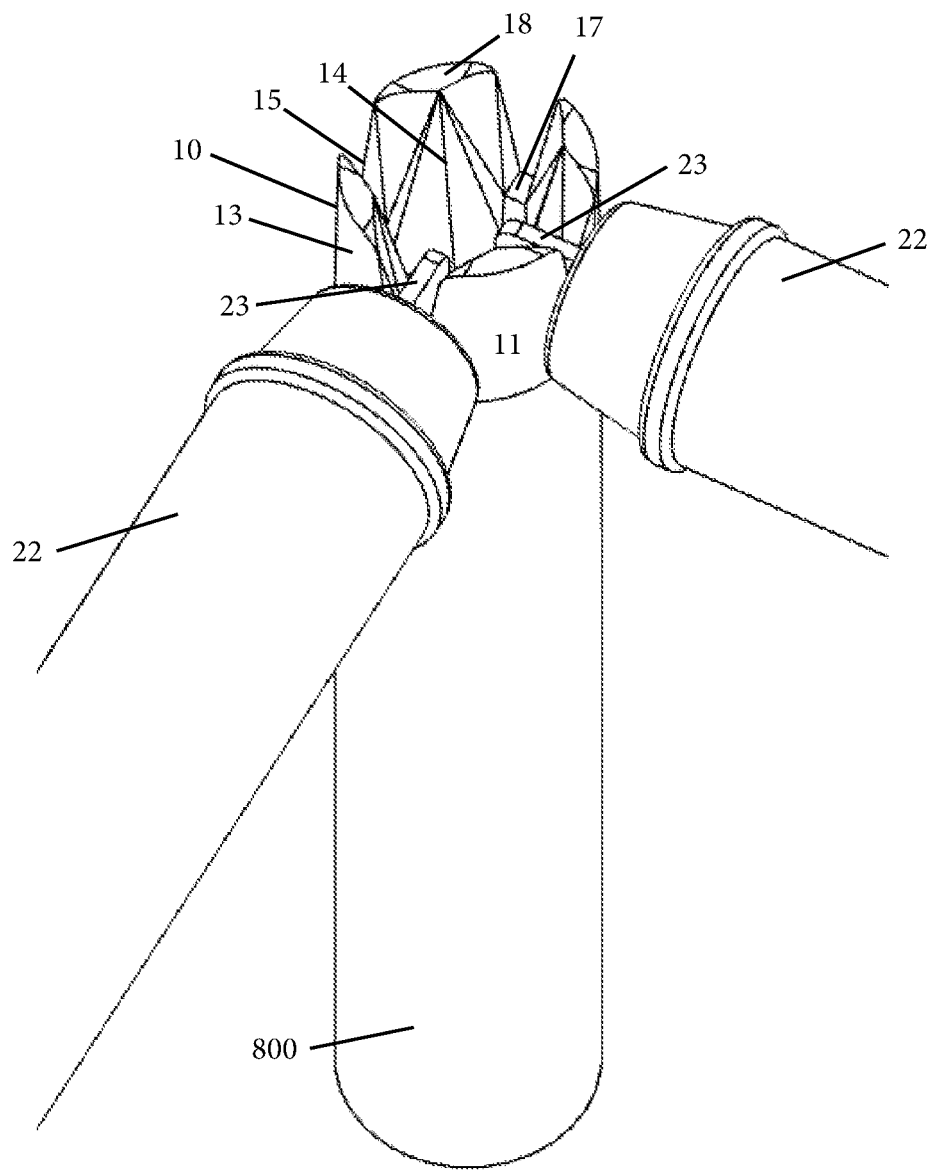
FIG. 2 is a perspective view of one embodiment of industry standard horizontal drape rods affixed to the pipe-mounted coupler.
Figure 3:
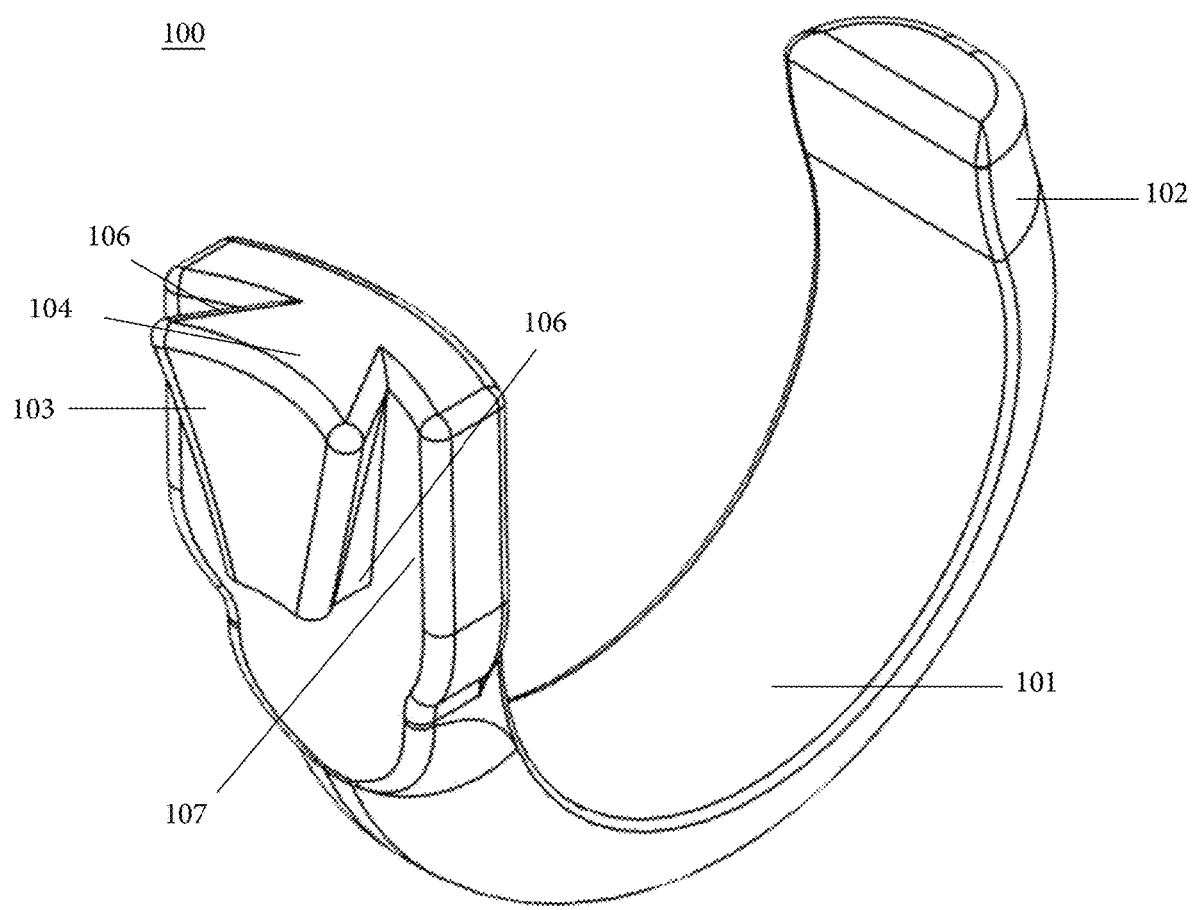
FIG. 3 is a perspective view of one embodiment of an accessory hanger.

FIG. 1 provides a limited isometric view of the pipe-mounted coupler 10, which is used to construct the aforesaid pipe and drape booths. The one or more pipe-mounted couplers 10 displayed in FIGS. 8-11 may be substantially similar to the pipe-mounted coupler 10. However, certain embodiments of the pipe-mounted coupler 10 may have more or fewer openings 15 due to mounting options. The coupler 10 is used to construct the aforesaid pipe and drape booths. The steel terminal hooks traditionally used on the transverse rods in conventional systems to connect to the vertical member or a wall are used to connect to the instant coupler 10 as illustrated in FIG. 2. Coupler 10 has a body 11 and an upper region 13. The body 11 may be substantially circular. In alternate embodiments, the body 11 is another shape, such as square, hexagonal, or oblong. The upper region 13 may be of a similar outside dimension as the body 11 and/or of similar shape as the body 11. In an example, the upper region 13 is affixed to the body 11 or is molded, cast, or otherwise formed as a solitary piece or unit. In an internal portion of the coupler 10, at least one hollow well 14 opens vertically with at least one lateral notch or opening 15 formed in upper region 13 and designed to accept attachments, such as a connection apparatus, a securing mechanism, a latching mechanism, a fastener, a protruding member, an engagement member including a terminal hook used on an end of a horizontally placed rod or a wedge of 103 of an accessory hanger 100 as illustrated in FIG. 3. The coupler 10 may include any number of openings 15, such as 1, 3, 4, or 8. Examples herein illustrate a coupler 10 that has four openings 15 disposed at 90-degree positions on the upper region 13. For example, the openings 15 are positioned at 3:00, 6:00, 9:00, and 12:00. In examples, one or more of the openings 15 are replaced by a connection bridge or other connection hardware.

The hollow well 14 may be an open space surrounded continuously or discontinuously by the upper region 13. The hollow well 14 is open at a top portion to receive terminal hooks. The coupler 10 may be hollow such that the upper region 13 and the body 11 are formed as hollow rings without a floor. Alternatively, the coupler 10 may have a floor formed within.

The opening 15 is preferably formed in the upper region 13 with a wider upper dimension that tapers to a narrower seat 17 at the bottom of opening 15 such that a substantially V shape is formed. The seat 17 is positioned at a height above an internal floor, if present, of the hollow well 14 to allow industry standard terminal hooks to rest on the seat 17 within opening 15 and hollow well 14 such that, when used as a rod and drape booth framework, the drapery walls have a uniform, flat appearance and the hooks are securely retained in the opening 15. Upper region 13 has a thickness at seat 17 that is sufficient to engage and retain the terminal hooks of the horizontal rods.

The top surfaces 18 of the coupler 10 are preferably rounded but may be beveled or flat. Similarly, the tapering surfaces of opening 15 may be beveled, rounded, or flat. Beveled, rounded, or other surfaces on the top surfaces 18 and the opening 15 may be used to facilitate the sliding of the terminal hooks into the opening 15.

The coupler 10 illustrated in FIG. 1 has an affixed base region 12 on the lower region of the coupler 10. The base region 12 allows the coupler 10 to be inserted into an opening in the top of a vertical pipe or tube or around the opening. The base region 12 may have downwardly opening slots 19 which align with the traditional slots formed in standard vertical members to allow the slots on industry standard poles to remain usable when the coupler 10 is inserted into a standard support pipe. The slots 19 may have square, rounded or beveled edges and may include a web of material closing the lower end of the slot. The base region 12 may have a lattice or matrix structure to reduce raw material usage, reduce weight, and improve strength.

Preferably, coupler 10 will be made from durable reinforced polymer material, acrylonitrile butadiene styrene plastic, Delrin, polyurethane, or some other suitable material that has sufficient strength and rigidity to effectuate the connection.

FIG. 2 is a perspective view of one embodiment of industry standard horizontal drape rods 22 affixed to the pipe-mounted coupler 10, in accordance with certain examples. FIG. 2 depicts coupler 10 inserted into an opening in the top of a vertical pipe 800. Horizontal rods 22 with terminal hooks 23 are depicted resting on seats 17 within openings 15. While two horizontal rods 22 are depicted, any suitable number of horizontal rods 22 may be affixed to coupler 10 by terminal hooks 23 resting on seats 17 within openings 15, for example, one, three, or four horizontal rods.

FIG. 3 is a perspective view of one embodiment of an accessory hanger 100. The accessory hanger 100 has one or more wedges 103 forming channels walls that are configured to slide into the openings 15 of the coupler 10.

The accessory hanger 100 has a wedge 103 that is disposed along the exterior wall 107 of the upper body of the accessory hanger 100. The accessory hanger 100 slides into an opening 15 of the connector 10 when the accessory hanger 100 is affixed to the coupler 10. Because the opening 15 of a coupler 10 is tapered from a wider opening at the top to a smaller opening on the bottom, the wedge 103 of the accessory hanger 100 will lower into the opening 15 until the wedge 103 is as wide as the opening 15. The wedge 103 has a top outer surface 104 and a bottom outer surface 105. The top dimension of the top outer surface 104 is greater than the bottom dimension of the bottom outer surface 105 forming a substantially V shape. In an example, the angle of the V shaped opening of the opening 15 is the same angle as the V shape of the wedge 103 such that, then mated, the opening 15 and the wedge 103 have contact along their mating surfaces. When the wedge 103 is as wide as the opening 15, the wedge 103 will rest on the coupler 10 and be supported in place by the coupler 10. The mated sections of the opening 15 and the wedge 103 prevent the accessory hanger 100 from spinning, pulling out of the opening 15, or being forced farther into the opening 15. This secured position allows accessories to be attached to the accessory hanger 100 securely and rigidly.

The wedge 103 has side surfaces 106 that taper inward towards exterior wall 107. In an example, exterior wall 107 is substantially flat. In an alternate example, exterior wall 107 has a shape to conform to the shape of the upper region 13 of the coupler 10. For example, exterior wall 107 may be substantially concave to conform to a substantially rounded, convex shape of upper region 13.

The accessory hanger 100 has a circular body 101 that is configured to securely support a cylindrical pipe. The body 101 is constructed of a material that is substantially rigid to support the pipe, but flexible enough, i.e., deformable, to allow a pipe to be snapped into place inside the body 101. For example, the body may be constructed of plastic, fiberglass-embedded nylon, rubber, or any other suitable material. The body 101 may form a semicircle to encompass the pipe. In an example, the body 101 forms a portion of a circle that is more than a semicircle, such as 190 degrees of a circle or 200 degrees. When the body 101 forms a major arc of a circle that is greater than a semicircle, the pipe will be secured inside the body 101. To place a pipe inside the body 101, the body 101 would be deformed such that the body 101 is spread open forming a portion of a substantially circular shape (i.e., elliptical) with a larger diameter (i.e., major axis). In an example, the pipe is positioned above and in contact with the body 101 of the accessory hanger 100. A force, i.e., downward force, is applied to the pipe deforming the body 101. When the pipe passes into the interior of the body 101, the body 101 is allowed to return to a resting position. The body 101 conforms to the outer surface of the pipe. The pipe is thus secured inside the body 101.

In the example, the opposing end 102 of the accessory hanger 100 is bent outward from the angle of the circular body 101. The outward bend of the opposing end 102 allows the opposing end 102 to receive a pipe that is being forced into the body 101. The opposing end 102 accepts the pipe being forced downward. As the pipe slides downward inside the circumference, i.e., inner surface, of the opposing end 102, the body 101 is forced to deform outward until the pipe slides into the internal circumference of the body 101. Then body 101 then snaps back to the original shape encircling the pipe.

In an alternate example, the pipe comprises a deformable material to conform to the inner surface of body 101. In an example, the pipe is positioned above and in contact with the body 101 of the accessory hanger 100. A force, i.e., downward force, is applied to the pipe, deforming the outer surface of the pipe, and causing the pipe to pass into the interior of the body 101. The pipe conforms to the inner surface of body 101. The pipe is thus secured inside the body 101.

When the accessory hanger 100 has a pipe secured, the pipe is supported in place. For example, a pipe may be secured on either end of the pipe by couplers 10 or other hangers. In certain examples, the pipe may be bent to form a small arc, such as to provide a drape that is rounded to define a rounded presentation area. If the pipe is supported on either end but not in the middle section of the arc, the configuration may be unstable and tip over in the direction of the bent arc due to the off-center weight of the pipe. The bent pipe may need support in the middle section. An additional upward (i.e., vertical) pipe may be placed near the bent pipe section. A coupler 10 may be placed on the upward pipe. An accessory hanger 100 may be affixed to the coupler 10 as described herein. The pipe section may be placed into the accessory hanger 100 as described herein. The pipe section is thus secured from becoming unstable.

Figure 4:
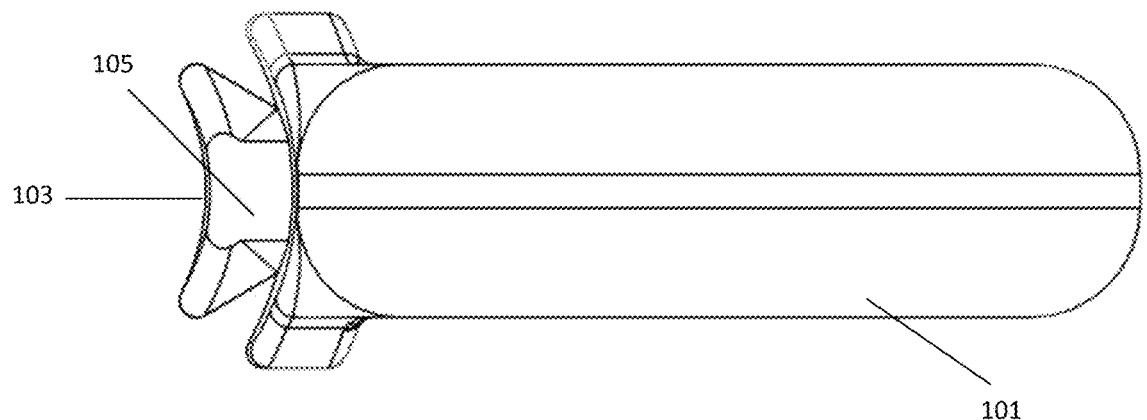
FIG. 4 is a bottom view of one embodiment of the accessory hanger.

FIG. 4 is a bottom view of one embodiment of the accessory hanger 100. The wedge 103 is illustrated as protruding out from the body 101 of the accessory hanger 100.

Figure 5:
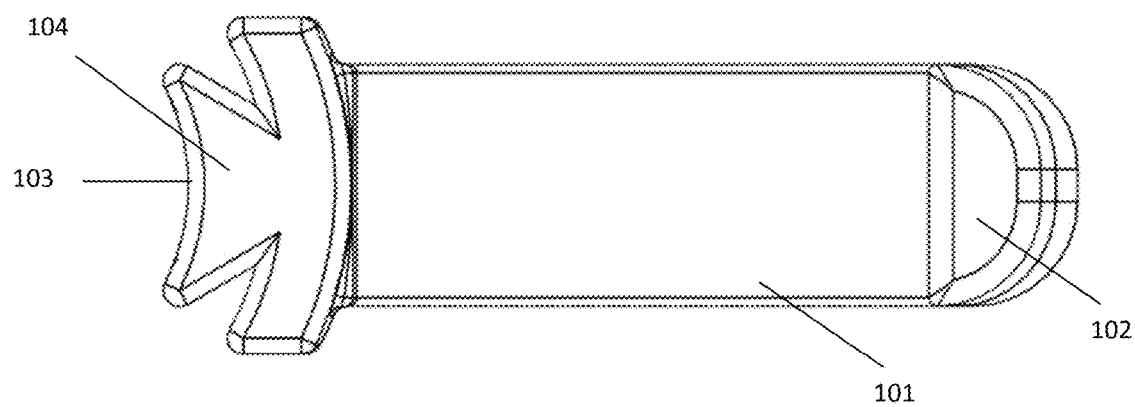
FIG. 5 is a top view of one embodiment of the accessory hanger.

FIG. 5 is a top view of one embodiment of the accessory hanger 100. The wedge 103 is illustrated as protruding out from the body 101 of the accessory hanger 100. The opposing end 102 is illustrated as bending outward from the circular disposition of the body 101.

Figure 6:
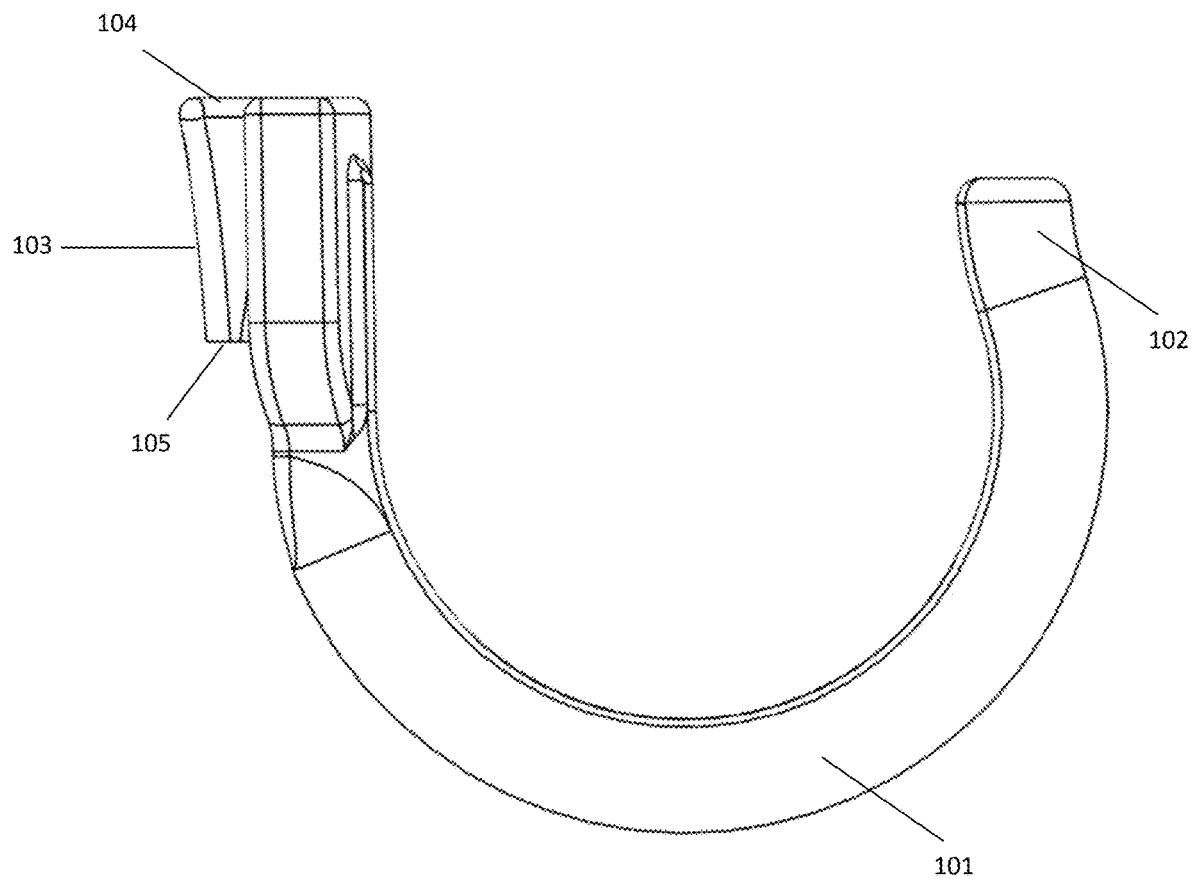
FIG. 6 is a side view of one embodiment of the accessory hanger.

FIG. 6 is a side view of one embodiment of the accessory hanger 100. The wedge 103 is illustrated as protruding out from the body 101 of the accessory hanger 100. The opposing end 102 is illustrated as bending outward from the circular disposition of the body 101.

Figure 7:
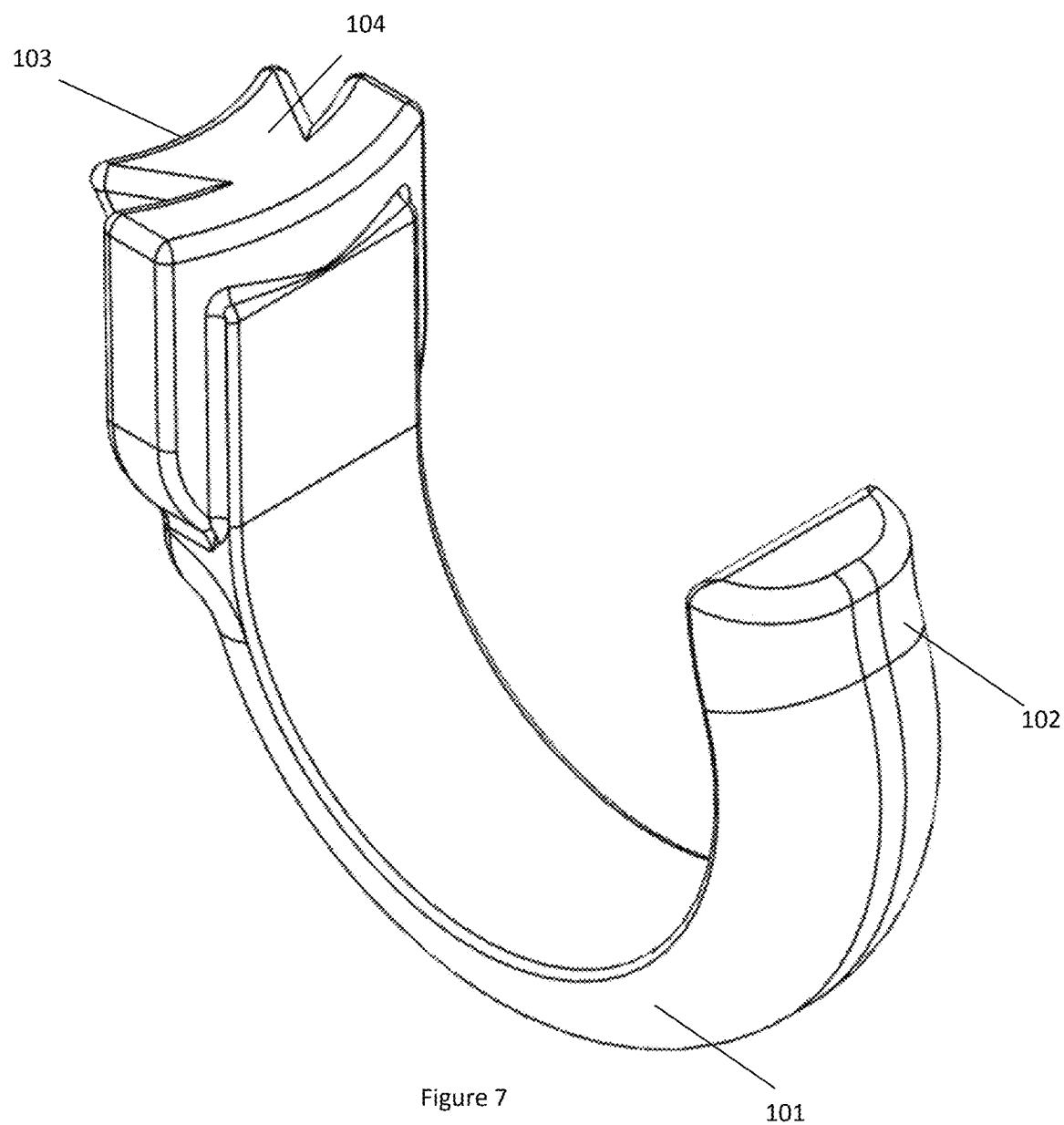
FIG. 7 is a perspective view of one embodiment of the accessory hanger.

FIG. 7 is a perspective view of one embodiment of the accessory hanger 100. The wedge 103 is illustrated as protruding out from the body 101 of the accessory hanger 100. The opposing end 102 is illustrated as bending outward from the circular disposition of the body 101.

Figure 8:
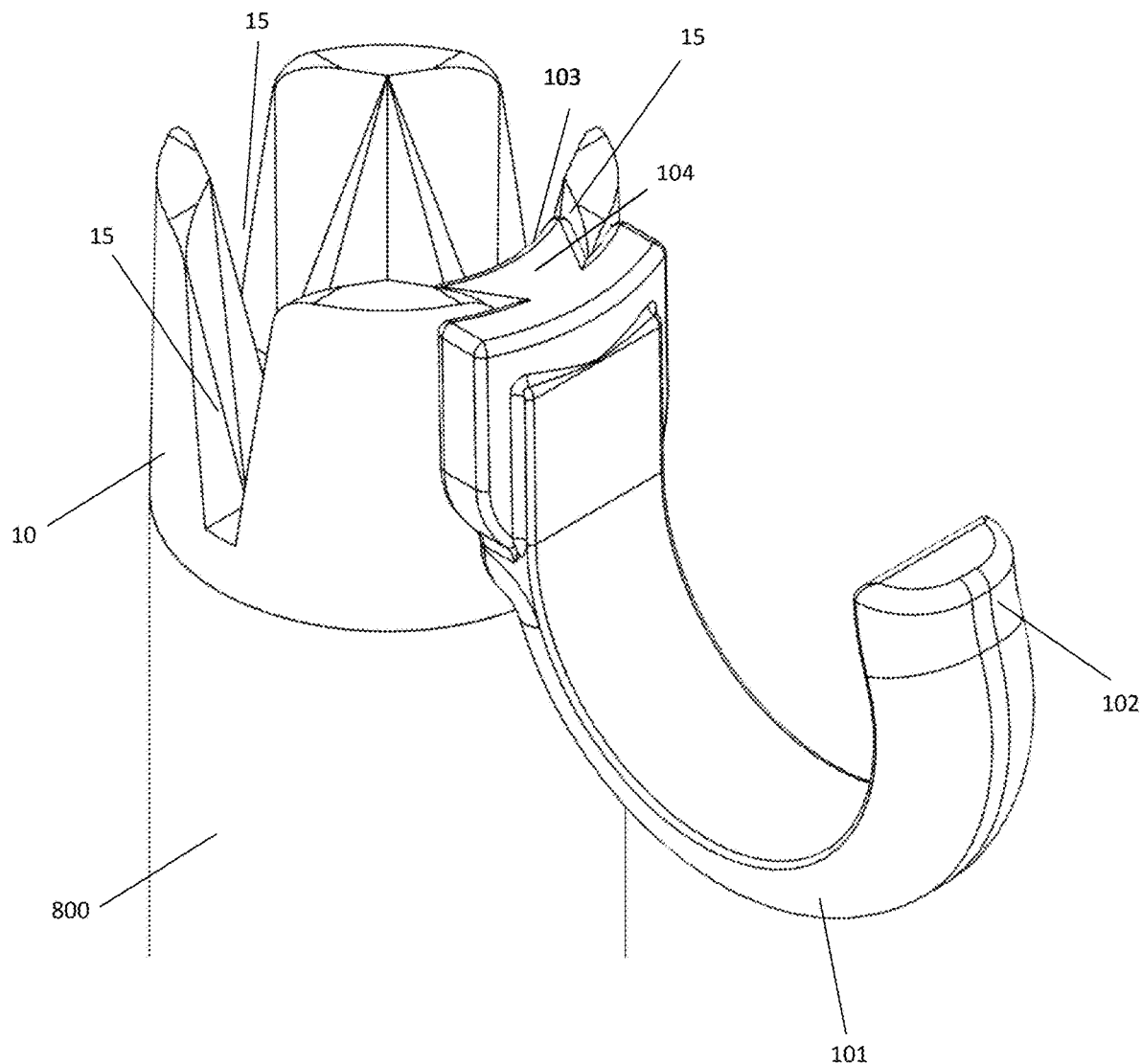
FIG. 8 is a perspective view of one embodiment of the accessory hanger affixed to a pipe-mounted coupler.

FIG. 8 is a perspective view of one embodiment of the accessory hanger 100 affixed to a pipe-mounted coupler 10. The wedge 103 is illustrated as protruding out from the body 101 of the accessory hanger 100 and inserted into an opening 15 of the coupler 10. The opposing end 102 is illustrated as bending outward from the circular disposition of the body 101. The coupler 10 is affixed to a vertically mounted pipe 800. In an example, additional openings 15 of pipe-mounted coupler 10 may accept additional accessories, such as horizontal rods 22 with terminal hooks 23 as depicted in FIG. 2 and/or additional accessory hangers 100.

Figure 9:
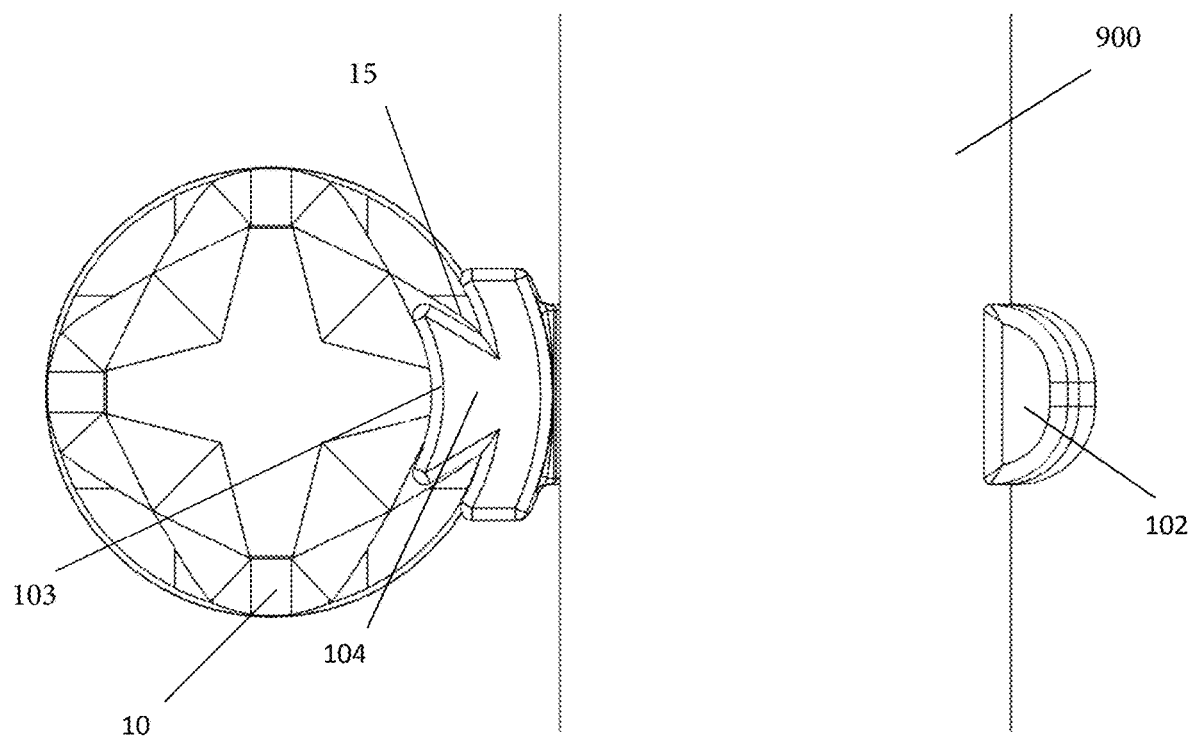
FIG. 9 is a top view of one embodiment of the accessory hanger affixed to a pipe-mounted coupler and supporting a horizontal pipe.

FIG. 9 is a top view of one embodiment of the accessory hanger 100 affixed to a pipe-mounted coupler 10 and supporting a horizontal pipe 900. The wedge 103 is illustrated as protruding out from the body 101 of the accessory hanger 100 and inserted into an opening 15 of the coupler 10. The opposing end 102 is illustrated as bending outward from the circular disposition of the body 101. The coupler is affixed to a vertically mounted pipe 800 (not shown). The horizontal pipe 900 is mounted into the opening of the accessory hanger 100. The opposing end 102 of the accessory hanger 100 is shown as enclosing a portion of the horizontal pipe 900 that is beyond 180 degrees of the arc of the pipe 900.

Figure 10:
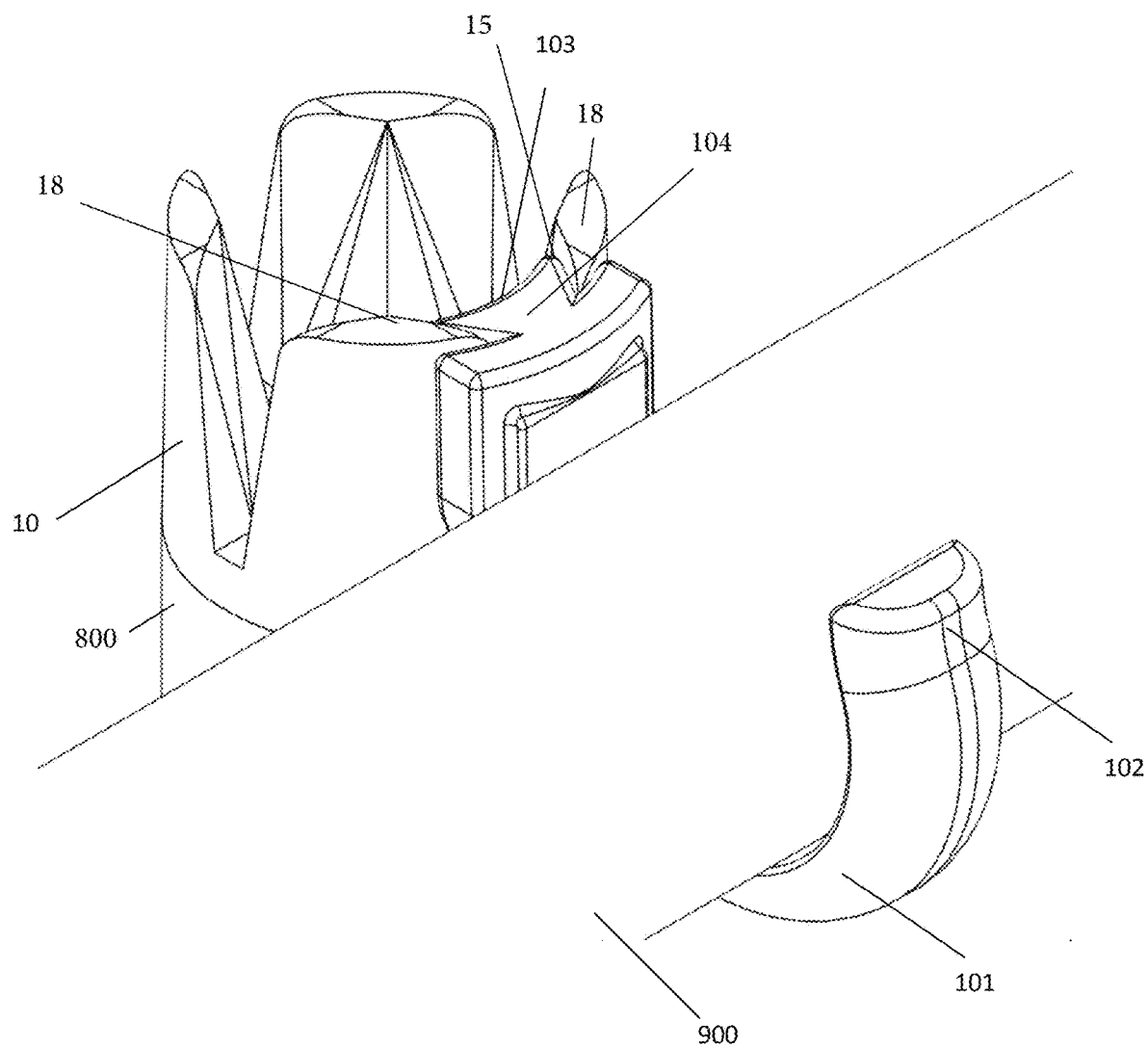
FIG. 10 is a perspective view of one embodiment of the accessory hanger affixed to a pipe-mounted coupler and supporting a horizontal pipe.

FIG. 10 is a perspective view of one embodiment of the accessory hanger 100 affixed to a pipe-mounted coupler 10 and supporting a horizontal pipe 900. The wedge 103 is illustrated as protruding out from the body 101 of the accessory hanger 100 and inserted into an opening 15 of the coupler 10. Top outer surface 104 is illustrated as substantially aligning with top surfaces 18 of coupler 10. The opposing end 102 is illustrated as bending outward from the circular disposition of the body 101. The coupler is affixed to a vertically mounted pipe 800. The horizontal pipe 900 is mounted into the opening of the accessory hanger 100. The opposing end 102 of the accessory hanger 100 is shown as enclosing a portion of the horizontal pipe 900 that is beyond 180 degrees of the arc of the pipe 900.

Figure 11:
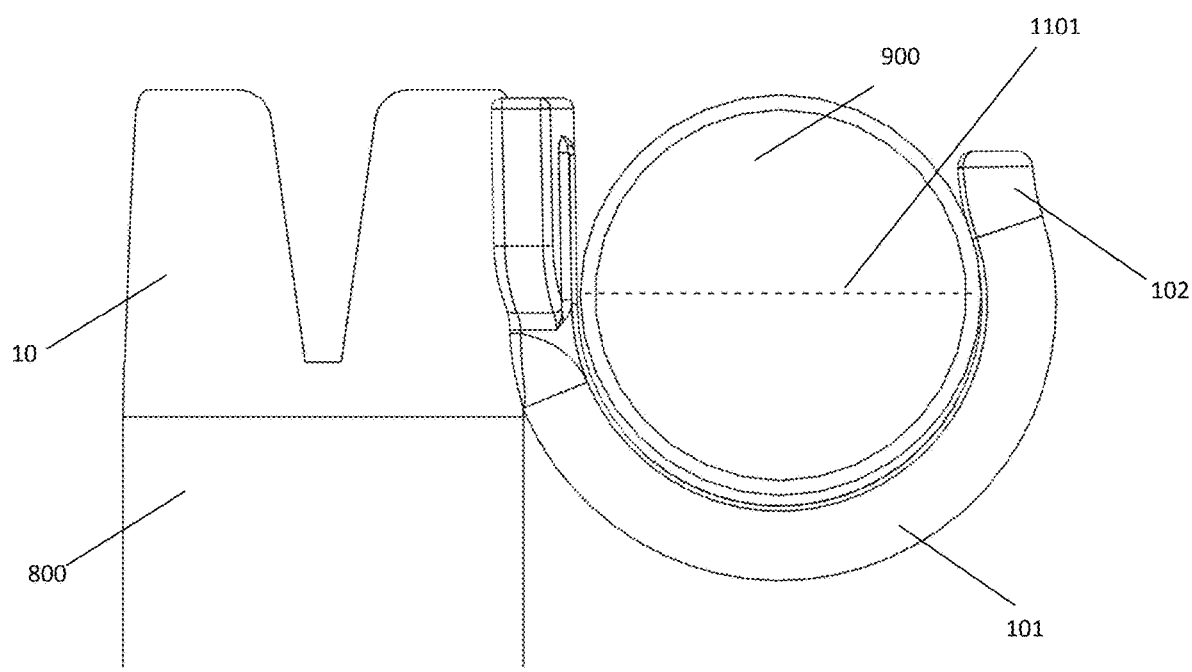
FIG. 11 is a side view of one embodiment of the accessory hanger affixed to a pipe-mounted coupler and supporting a horizontal pipe.

FIG. 11 is a side view of one embodiment of the accessory hanger 100 affixed to a pipe-mounted coupler 10 and supporting a horizontal pipe 900. The wedge 103 is illustrated as protruding out from the body 101 of the accessory hanger 100 and inserted into an opening 15 of the coupler 10. The opposing end 102 is illustrated as bending outward from the circular disposition of the body 101. The coupler is affixed to a vertically mounted pipe 800. The coupler 10 is affixed to a vertically mounted pipe 800.

The horizontal pipe 900 is mounted into the opening of the accessory hanger 100. The opposing end 102 of the accessory hanger 100 is shown as enclosing a portion of the horizontal pipe 800 that is beyond 180 degrees of the arc of the horizontal pipe 900. A dashed line 1101 is illustrated to show the outer diameter of the horizontal pipe 900. The portion of horizontal pipe 900 below the dashed line 1101 is half of the circumference of the horizontal pipe, i.e., an arc of 180 degrees. As depicted in FIG. 11, the accessory hanger 100 encases a portion of the horizontal pipe 900 that is greater than half of the circumference of the horizontal pipe, that is, an arc of greater than 180 degrees. As opposing end 102 is disposed in a position on the arc greater than 180 degrees, the opposing end 102 exerts a normal force on the horizontal pipe 900 with a vertical force component in a downward direction relative to the horizontal pipe 900. The horizontal pipe 900 is thus secured from being raised vertically out of the accessory hanger 100 unless the body 101 is deformed outward.

What is claimed is:

1. An accessory hanger to mount to pipe-mounted couplers, comprising:
   a vertical portion transitioning downward into an upwardly opening semi-circular body, the vertical portion comprising an exterior surface facing away from the upwardly opening semi-circular body, the exterior surface comprising:
      a concave shape configured to conform to an exterior surface of a pipe-mounted coupler; and
      a wedge extending outward from the exterior surface, the wedge comprising:
         a top wedge surface comprising a top width greater than a bottom width of a bottom wedge surface, and
         side surfaces tapering inward toward the exterior surface,
   wherein the accessory hanger is configured to support a horizontal pipe by affixing the wedge to an opening in the pipe-mounted coupler and inserting the horizontal pipe into the upwardly opening semi-circular body.

2. The accessory hanger of claim 1, the semi-circular body extending greater than 180 degrees to secure a portion of the horizontal pipe enclosed within the accessory hanger.

3. The accessory hanger of claim 1, the semi-circular body of the accessory hanger deformable to accept a portion of the horizontal pipe.

4. The accessory hanger of claim 3, the semi-circular body configured to conform to an outer surface of the portion of the horizontal pipe to secure the horizontal pipe within the accessory hanger.

5. The accessory hanger of claim 1, the semi-circular body comprising a deformable material.

6. The accessory hanger of claim 5, the deformable material comprising one or more of a plastic, a fiberglass-embedded nylon, or a rubber.

7. A method to mount an accessory hanger to a coupler, comprising:
affixing an accessory hanger to a coupler, the accessory hanger comprising:
a vertical portion transitioning downward into an upwardly opening semi-circular body, the vertical portion comprising an exterior surface facing away from the upwardly opening semi-circular body, the exterior surface comprising:
a concave shape configured to conform to an exterior surface of the coupler; and
a wedge extending outward from the exterior surface, the wedge comprising:
a top wedge surface comprising a top width greater than a bottom width of a bottom wedge surface, and
side surfaces tapering inward toward the exterior surface,
wherein the accessory hanger, when the wedge is mated with an upwardly opening slot in the coupler, is affixed to the coupler,
extending an opposing end of the accessory hanger such that a diameter of the semi-circular body of the accessory hanger increases; and
inserting a pipe into the semi-circular body of the accessory hanger with the increased diameter, wherein the diameter of the semi-circular body of the accessory hanger decreases to correspond with an outer diameter of the pipe securing the pipe within the semi-circular body of the accessory hanger.

8. The method of claim 7, wherein the semi-circular body extends greater than 180 degrees and is configured to secure a portion of the pipe to be enclosed within the accessory hanger.

9. The method of claim 8, wherein extending the opposing end of the accessory hanger comprises deforming the semi-circular body to accept the portion of the pipe.

10. The method of claim 9, wherein the semi-circular body conforms to an outer surface of the portion of the pipe securing the pipe within the accessory hanger.

11. The method of claim 7, wherein extending the opposing end of the accessory hanger comprises:
positioning the pipe above the semi-circular body of the accessory hanger; and
applying a downward force on the pipe to secure the pipe within the semi-circular body of the accessory hanger.

12. An accessory hanging system comprising:
an accessory hanger comprising:
a vertical portion transitioning downward into an upwardly opening semi-circular body, the vertical portion comprising an exterior surface facing away from the upwardly opening semi-circular body, the exterior surface comprising:
a concave shape configured to conform to an exterior surface of a pipe-mounted coupler; and
a wedge extending outward from the exterior surface of the semi-circular body, the wedge comprising:
a top wedge surface comprising a top width greater than a bottom width of a bottom wedge surface, and
side surfaces tapering inward toward the exterior surface;
the pipe-mounted coupler; and
a horizontal pipe.

13. The accessory hanging system of claim 12, the pipe-mounted coupler comprising an upper region, the upper region encompassing an upwardly opening well formed within a body of the upper region, the upwardly opening well of the upper region defining a plurality of upwardly opening slots.

14. The accessory hanging system of claim 13, each of the plurality of upwardly openings slots comprising an upper dimension greater than a lower dimension forming a V shape.

15. The accessory hanging system of claim 14, the V shape of the wedge configured to mate with the V shape of an upwardly opening slot of the plurality of upwardly openings slots to secure the accessory hanger to the pipe-mounted coupler.

16. The accessory hanging system of claim 13, each of the plurality of upwardly openings slots comprising an upper dimension greater than a lower dimension.

17. The accessory hanging system of claim 14, the wedge configured to mate with an upwardly opening slot of the plurality of upwardly openings slots to secure the accessory hanger to the pipe-mounted coupler.

* * * * *